Figure 1:
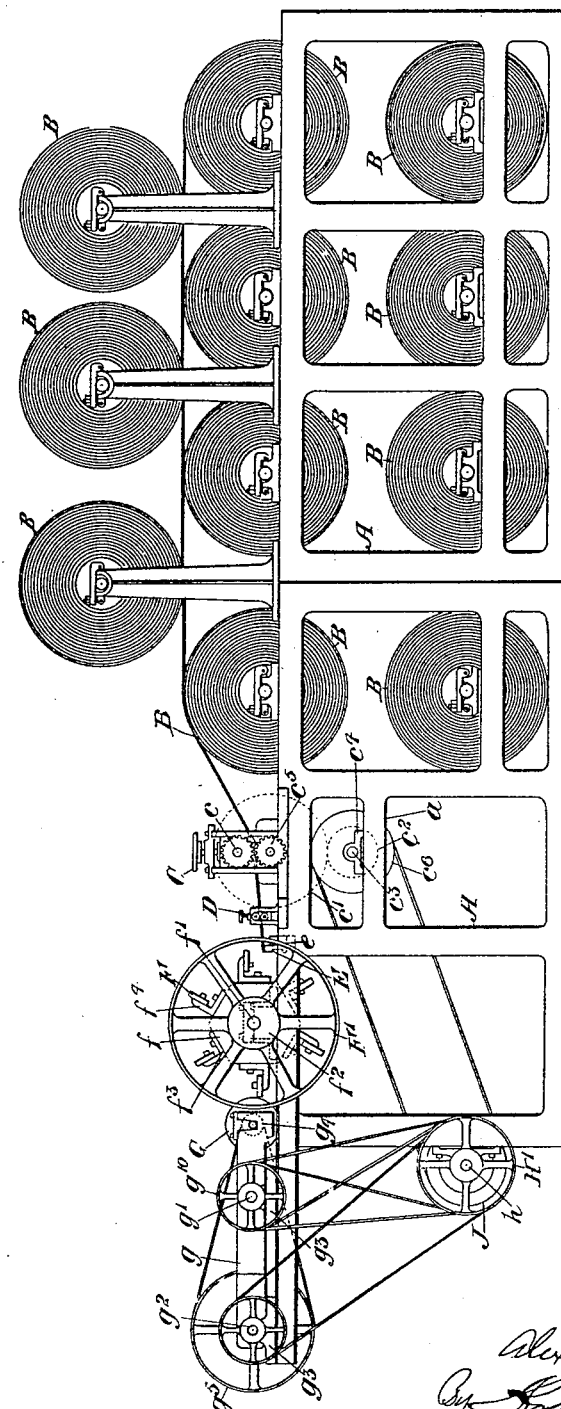

No. 801,790. PATENTED OCT. 10, 1905.
A. HENDERSON.
MACHINE FOR CUTTING PAPER INTO SHAVINGS, STRIPS, &c.
APPLICATION FILED APR. 12, 1904.

3 SHEETS—SHEET 1.

No. 801,790. PATENTED OCT. 10, 1905.
A. HENDERSON.
MACHINE FOR CUTTING PAPER INTO SHAVINGS, STRIPS, &c.
APPLICATION FILED APR. 12, 1904.
3 SHEETS—SHEET 2.
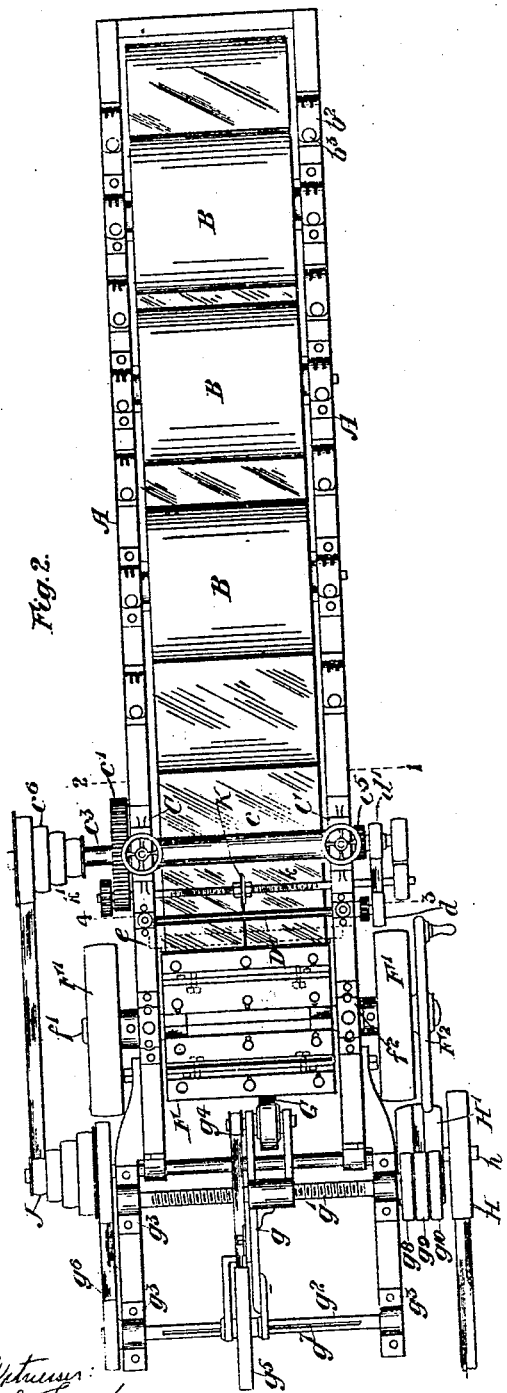
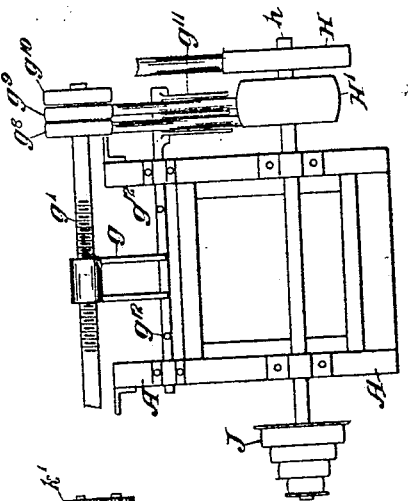
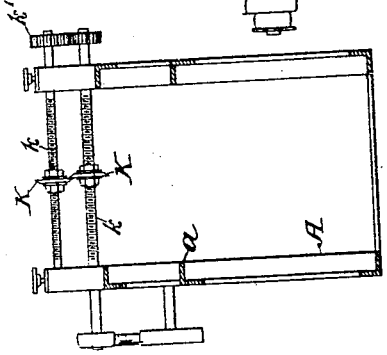
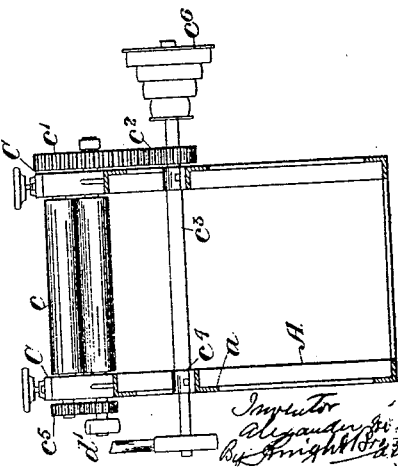

No. 801,790. PATENTED OCT. 10, 1905.
A. HENDERSON.
MACHINE FOR CUTTING PAPER INTO SHAVINGS, STRIPS, &c.
APPLICATION FILED APR. 12, 1904.
3 SHEETS—SHEET 3.
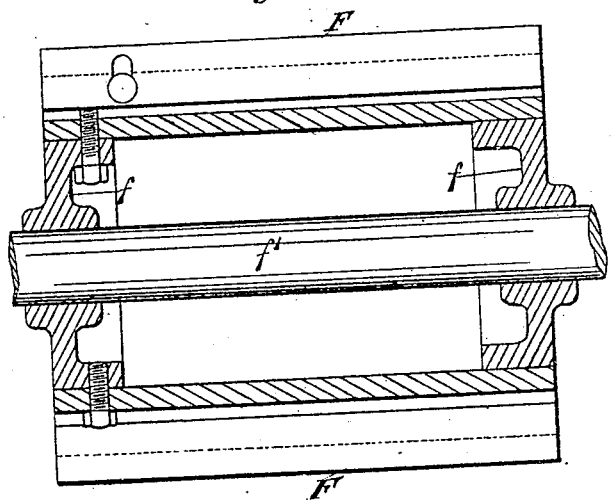
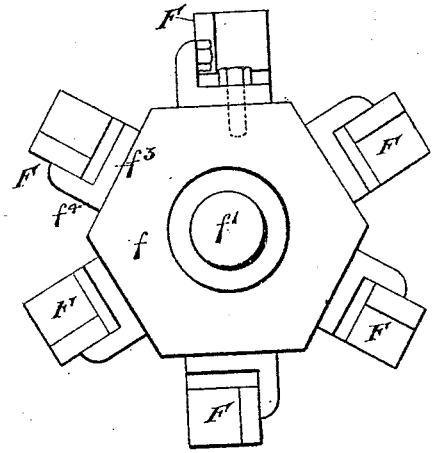
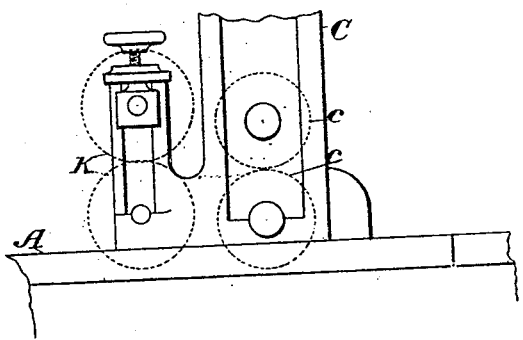
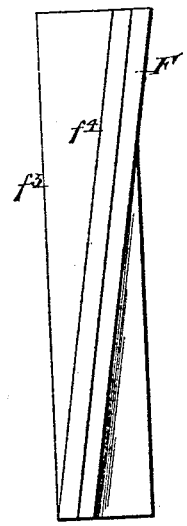
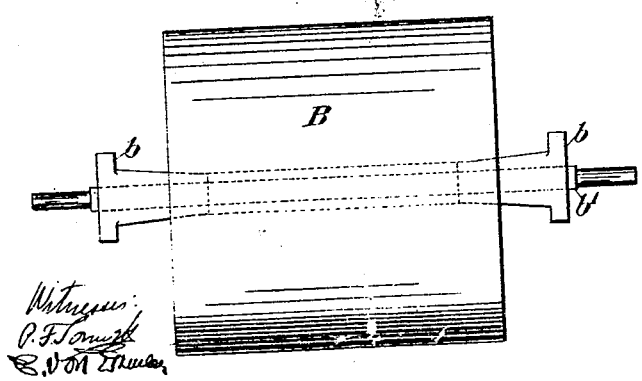

UNITED STATES PATENT OFFICE.

ALEXANDER HENDERSON, OF EDINBURGH, SCOTLAND, ASSIGNOR OF ONE-HALF TO GEORGE DUNCAN MACKAY, OF EDINBURGH, SCOTLAND.

MACHINE FOR CUTTING PAPER INTO SHAVINGS, STRIPS, &c.

No. 801,790.  Specification of Letters Patent.  Patented Oct. 10, 1905.

Application filed April 12, 1904. Serial No. 202,749.

*To all whom it may concern:*

Be it known that I, ALEXANDER HENDERSON, engineer, a subject of the King of the United Kingdom of Great Britain and Ireland, and a resident of 172 Easter road, Edinburgh, in the county of Mid-Lothian, Scotland, have invented new and useful Improvements in Machines for Cutting Paper into Shavings, Strips, and the Like, of which the following is a description.

This invention relates to a machine for cutting paper into shavings, strips, and the like, such as are used in packing confectionery and other goods.

Figure 1 is a side elevation of the machine. Fig. 2, a plan; Fig. 3, a sectional end elevation taken on line 1 2 of Fig. 2 looking to the left hand; Fig. 4, a sectional end elevation taken on line 3 4 of Fig. 2 looking to the right hand; Fig. 5, an end elevation of the left-hand side of Figs. 1 and 2; Fig. 6, a longitudinal sectional elevation, on an enlarged scale, of the rotating knife-carrier and knives; Fig. 7, an end view thereof; Fig. 8, a plan view of the knife and knife-carrier, showing the angle of same; Fig. 9, a detail of a bracket hereinafter referred to; Fig. 10, a side elevation of a paper-roll, showing the carrying-centers inserted therein; Fig. 11, an end view of the center for the paper-roll.

In the machine for cutting paper into shavings I mount on the frame A, Fig. 1, a series of paper-rolls B, the paper being drawn from each paper-roll through two pairs of drag-rollers $c$ and D and directed to a dead-knife E, at which point the paper is cut into shavings or strips, as desired, by the rotating knives F.

In the drawings eleven paper-rolls B are shown, so that eleven webs of paper will be cut simultaneously.

In order that the various mechanical motions be fully understood, I will set forth the actuation of the various parts.

Mounted in the housings C, supported on the frame A in advance of the paper-rolls B, are the drag-rollers $c$. The bottom roller of the pair of rollers is provided at one end with a spur-wheel $c'$, which is given a motion of rotation by a spur-pinion $c^2$, the pinion $c^2$ being mounted on the shaft $c^3$, which is supported on the bearings $c^4$, carried by the cross-stay $a$ of the frame A. The top roller of the pair of drag-rollers $c$ is given a motion of rotation by means of the gear-wheels $c^5$. Motion of rotation is imparted to the shaft $c^3$ by a belt-drive, as shown in Fig. 2, a speed-cone $c^6$ being secured to the end of the shaft $c^3$ for varying the speed of the drag-rollers $c$, and the arrangement is such that by varying the speed of the said drag-rollers a broader or narrower shaving is produced. For instance, if the drag-rollers $c$ were reduced in speed they would feed the paper to the dead-knife E more slowly. Consequently the rotary knives F would make more cuts on, say, an inch in length of the paper than they would if the paper were fed over the dead-knife E quicker. The arrangement of the rollers $c$ is shown more particularly in the end sectional elevation Fig. 3. The second or other pair of drag-rollers D are merely to assist the drag-rollers $c$ in guiding the paper onto the dead-knife E, the said rollers D being driven at the same speed as the rollers $c$ by means of the pulleys $d$ and belt $d'$, Fig. 2. The dead-knife E is mounted on the knife-carrier $e$, secured to each side of the frame A, as shown more particularly in dotted lines, Fig. 1.

The rotary knives F are mounted on the hexagonal end castings $f$, (shown more particularly in the enlarged detail Fig. 6,) the said castings being secured on the shaft $f'$, which is mounted across the frame A and supported in the bearings $f^2$, carried on the top of the said frames. The L-shaped metal bars $f^3$ (shown more particularly in Fig. 7) act as distance-pieces when bolted to the hexagonal end pieces $f$, the knives F being bolted to the upright projecting portion $f^4$ of the L-shaped bars $f^3$. Mounted on each end of the shaft $f'$ outside the frame A are the pulleys F', which pulleys receive power from a belt-drive and impart rotation to the knives F. The end of the shaft $f'$ is also provided with a hand-wheel $F^2$ for setting the knives preparatory to starting the machine. I also prefer that the knives F be ground while the paper is being cut, and to accomplish this I employ the emery-wheel G, carried by the bracket $g$. The said bracket $g$ is supported by the screwed spindle $g'$ and spindle $g^2$, which are carried in the bearings $g^3$, supported by the frame A, and the arrangement of the bracket $g$ is such that it slides from one side of the frame A to the other side thereof, so that the whole of the edge of the knife F is ground. The bracket $g$ is forked, as shown, for the reception of the emery-wheel G, and mounted on the emery-wheel spindle is the pulley $g^4$, which is driven from the pulley and belt $g^5$, the other end of the bracket $g$ being forked for the reception of the pulley $g^5$. The spindle $g^2$, which receives a motion of rotation from the pulley-belt $g^6$, Fig. 2, is formed with a sunk keyway $g^7$, and the bore of the pulley is provided with a key which slides in the keyway $g^7$, the object being to allow the said pulley to slide on the spindle $g^2$ as the emery-stone is traversed, but at the same time not to allow the said pulley to revolve loosely on the shaft.

The end of the spindle $g'$, as shown in Figs. 1 and 2 and more particularly in Fig. 5, is provided with the three pulleys $g^8$, $g^9$, and $g^{10}$, actuated by the pulley H' for the purpose of reversing the traverse of the emery-wheel G through the medium of the screwed spindle $g'$ and the internally-screwed portion of the bracket $g$, which the spindle passes through. The pulleys $g^8$ and $g^{10}$ are fast pulleys, with the center pulley $g^9$ the loose one, and to obtain the reverse motion I employ a cross-belt, Figs. 1 and 2, the arrangement being such that the bracket $g$ as it traverses to and fro actuates the belt-fork $g^{11}$ by means of the stops $g^{12}$, Fig. 5, and pushes the belt on the pulley to the position required. Fig. 5 shows one belt on the fast pulley $g^8$ and one belt on the loose pulley $g^9$.

The pulley H is for the purpose of imparting motion to the shaft $h$, on which is mounted the speed-cone J, which is connected by belt to the speed-cone $c^6$ for driving the drag-rollers $c$.

The paper-rolls B are provided with the centers $b$, as shown in Figs. 10 and 11, the spindle being formed with the square $b'$ to correspond with the center $b$, a journaled portion being provided on the said spindle. The bearings for the journals of the spindles of the paper-rolls B are as shown in Figs. 1 and 2—that is to say, they are so arranged that a certain amount of tension can be put onto the journal of the spindle by tightening down the cap $b^2$ by means of the nut $b^3$.

In the plan Fig. 2 and situated between the grip-rollers $c$ and D, I may employ one or more pairs of cutting-disks, such as K, for the purpose of cutting the paper into various widths, so that a longer or shorter shaving is produced, the said disks being mounted on the screwed spindles $k$, as shown more particularly in the section Fig. 4, which shows the arrangement for driving the said disks, the bottom and top spindles being geared together by means of the gear-wheels $k'$, the top roller being so geared that it is slightly slower than the bottom one.

Fig. 9 shows an enlarged side elevation of the arrangement of the disks K with the grip-rollers $c$.

The position of the knives F is adjustable on the carriers—that is to say, relatively with the dead-knife E. Also the dead-knife may be adjusted. Also the emery-wheel may be adjusted.

Any number of disks, such as K, Figs. 2 and 4, may be mounted on the screwed spindle $k$, according to the size of paper required to be cut.

In lieu of cutting paper into shavings I may adapt the machine for cutting paper into strips or squares, such as are used for wrapping sweetmeats, soaps, and the like. To effect this, I remove one or more of the knives F, which allows more time between the cuts. Consequently a broader strip of paper is produced—that is to say, that the rotary disks K slitting or cutting the paper lengthwise and the knives F cutting the paper at right angles thereto, whereby rectangular, square, or oblong portions of paper are produced for wrapping purposes, as indicated above.

To further assist the grip-rollers $c$ and D in conveying the paper from the rolls B to the dead-knife E, I may employ two endless belts driven by any suitable means fitted between the grip-rollers $c$ and D, the arrangement being such that the paper passes between the grip-rollers $c$, thence between the endless belt through the small grip-rollers D to the dead-knife E.

I claim—

1. In a machine for cutting paper into narrow shavings, the combination of means for feeding paper from any desired number of rolls, paired drag-rollers for drawing the paper through the machine, a transverse revolving shaft carrying a number of parallel blades working in conjunction with a stationary knife for cutting the paper into narrow shavings of desirable width and a revolving grinding-wheel moving transversely in contact with the said knives for sharpening the same during the cutting operation, substantially as described.

2. In a machine for cutting paper into shavings, the combination of means for feeding the paper from rolls, drag-rollers by which the paper is drawn through the machine, a transverse shaft carrying a number of parallel knives for cutting the paper transversely into narrow shavings, a rotary grinding-wheel working in contact with the transverse rotating knives to sharpen them during the cutting operation, a carrying-frame and transverse screw-shaft on which the grinding-wheel is mounted and automatic means for rotating the screw-shaft alternately in opposite directions and thereby moving the grinding-wheel back and forth across the machine, substantially as described.

ALEXANDER HENDERSON. [L. S.]

Witnesses:
FREDERICK PIATT,
GEORGE BRAID.